(12) United States Patent
Söderberg

(10) Patent No.: US 6,175,606 B1
(45) Date of Patent: Jan. 16, 2001

(54) FILTER FOR A NUCLEAR FUEL ASSEMBLY

(75) Inventor: Håkan Söderberg, Västerås (SE)

(73) Assignee: ABB Atom AB, Vasteras (SE)

( * ) Notice: Under 35 U.S.C. 154(b), the term of this patent shall be extended for 0 days.

(21) Appl. No.: 09/319,364

(22) PCT Filed: Dec. 11, 1997

(86) PCT No.: PCT/SE97/02066
§ 371 Date: Jul. 26, 1999
§ 102(e) Date: Jul. 26, 1999

(87) PCT Pub. No.: WO98/28752
PCT Pub. Date: Jul. 2, 1998

(30) Foreign Application Priority Data

Dec. 20, 1996 (SE) ................................................ 9604811

(51) Int. Cl.[7] .............................. G21C 19/28; G21C 3/04; G21C 3/322
(52) U.S. Cl. .......................... 376/313; 376/352; 376/444
(58) Field of Search ................................ 376/313, 352, 376/362, 364, 395, 399, 400, 443, 444

(56) References Cited

U.S. PATENT DOCUMENTS

| | | | |
|---|---|---|---|
| 5,219,517 | * 6/1993 | Nylund | 376/352 |
| 5,361,287 | * 11/1994 | Williamson | 376/352 |
| 5,471,514 | * 11/1995 | Soderlund | 376/313 |
| 5,473,649 | * 12/1995 | Olsson et al. | 376/313 |

FOREIGN PATENT DOCUMENTS

| | | |
|---|---|---|
| 43 32 678 A1 | 4/1994 | (DE) . |
| 0 655 746 A1 | 5/1995 | (EP) . |
| 0 656 630 A1 | 6/1995 | (EP) . |
| 0 710 961 A1 | 5/1996 | (EP) . |
| 465 191 | 5/1991 | (SE) . |

* cited by examiner

Primary Examiner—Charles T. Jordan
Assistant Examiner—Kyongtark K. Mun
(74) Attorney, Agent, or Firm—Pollock, Vande Sande & Amernick, RLLP

(57) ABSTRACT

A fuel assembly (1) for a boiling water nuclear reactor comprising a plurality of vertical fuel rods (3) which are arranged in spaced relationship between a bottom tie plate (6) and a top tie plate (5). The bottom tie plate (6) is provided with through-holes (6a) for the passage of a coolant (F). Further, the fuel assembly (1) comprises a bottom support (10) which is formed substantially from a downstream and an upstream flat surface (12, 13) and four side surfaces (14). The flat surfaces (12, 13) and the side surfaces (14) form a parallelepiped which surrounds a cavity. A filtering member is arranged in the upstream flat surface (13) and comprises a plurality of through-holes (11).

6 Claims, 5 Drawing Sheets

A-A

B-B

C - C

FILTER FOR A NUCLEAR FUEL ASSEMBLY

TECHNICAL FIELD

The present invention relates to a filter for capturing foreign matter transported with the coolant in a light-water nuclear fuel assembly, more precisely a nuclear fuel assembly of boiling water type.

BACKGROUND ART

A fuel assembly in a boiling water nuclear reactor comprises a long tubular container. The container is often made with a rectangular or square cross section and is open at both ends to make possible a continuous flow of coolant through the fuel assembly. The fuel assembly comprises a large number of equally long tubular fuel rods, arranged in parallel in a certain definite, normally symmetrical pattern. The fuel rods are retained at the top by a top tie plate and at the bottom by a bottom tie plate. To allow coolant to flow along the fuel rods in the desired way, it is important that these be spaced from each other and prevented from bending or vibrating when the reactor is in operation. For this purpose, a plurality of spacers are used, distributed along the fuel assembly in the longitudinal direction.

Experience has shown that in connection with repair and service of nuclear reactors, foreign matter may enter the coolant of the nuclear reactor. The foreign matter then moves with the coolant which circulates through the reactor core. The foreign matter may, among other things, consist of metal chips formed in connection with repair of, for example, a steam separator, pieces of metal wire or oxide flakes which have been torn loose from, for example, the fuel rods where they have been formed. The foreign matter may give rise to wear damage which may result in serious consequences if the damage arises on parts which are particularly fragile, such as on the fuel rods.

To avoid damage of the above kind, it is known to design various kinds of filters close to the lower part of the fuel assembly. The filter prevents the foreign matter from reaching the fuel rods. It is known, for example, to design the bottom tie plate, to which the fuel rods are attached, with a large number of through-holes. In this way, a strainer is provided, which prevents foreign matter from reaching the fuel rod bundle with control-rod guide tubes and spacers. It is also known to arrange various types of helical springs in a so-called bottom support in which the fuel bundle is arranged to rest. The helical springs are adapted to prevent debris from passing with the coolant flow through the bottom support and up through the bottom tie plate.

By arranging additional structural parts in the flow path of the coolant through the fuel assembly, the pressure drop across the fuel assembly increases. The pressure drop may be increased within certain limits. Too high a pressure drop may, in the worst case, lead to so-called dryout. To minimize the risk of dryout, the fuel assembly is formed with a flow of coolant which with a fixed margin, the so-called dryout margin, exceeds the coolant flow where dryout occurs under the present conditions.

A disadvantage of arranging loose parts in the bottom tie plate or in the bottom support for capturing any foreign matter is that these may be set into vibration because of the high pressure of the coolant. During the vibration, wear arises, whereby the loose parts may become detached. It may also result in flakes of the material, against which the wear occurs, loosening and accompanying the coolant.

SUMMARY OF THE INVENTION

According to the present invention, a debris catcher is designed in a bottom support arranged below a normally substantially vertically arranged fuel bundle. The fuel bundle may possibly be divided into four sub-bundles. The bottom support controls the fuel bundle in a transition piece which, in turn, is intended to be arranged in a so-called assembly supporting plate in a reactor core. The transition piece guides the coolant, flowing upwards through the core of fuel assemblies, into the respective fuel assembly through the bottom support. The bottom support comprises either a unit which is separate from the transition piece, or a part which is integrated into the transition piece.

To give the bottom support a filtering effect, the filter is designed with a plurality of continuous, substantially straight continuous, holes forming a strainer. The bottom support is substantially designed as a parallelepiped with a square flat side. The parallelepiped is provided with a downstream and an upstream flat side and four narrow sides. The flat sides and the narrow sides surround a cavity and form a parallelepiped. The downstream flat side is formed with one or more openings to receive the lower ends of a fuel bundle or a plurality of fuel bundles. The substantially straight holes are arranged in the upstream flat side, forming a filter through which the coolant is forced to pass before it reaches the fuel rods arranged in the fuel bundle or in the fuel bundles.

The advantage of the invention is that the filter is formed as an integral part of a structural part, namely, the bottom support or the transition piece. Because of its shape as an integral part of the bottom support, or the transition piece, the filter may be given a very high strength, the risk of vibrations arising thus being very small.

The above-mentioned shape of the bottom support, or the transition piece, implies that that pressure drop across this becomes higher than if the upstream flat side is designed with one single large through-opening as in the normal case. By arranging the filter integrated with the bottom support, or the transition piece, instead of in the bottom tie plate, the bottom tie plate may, however, be given a more open structure. In this way, the increased pressure drop, caused by the integral filter, is compensated such that a dryout margin set for the fuel assembly may be maintained.

By arranging the through-holes in the bottom support, or the transition piece, instead of in the bottom tie plate, greater freedom of choice is also provided as regards the location of the holes. When locating the through-holes in the bottom tie plate, also the location of the fuel rods must be taken into consideration. Another advantage of arranging the through-holes in the bottom support instead of in the bottom tie plate is that the filter may be made with a considerably greater strength.

Another important factor when designing a filter is that the risk of clogging thereof is minimized. According to one embodiment of the present invention, this problem is solved by arranging so-called bypass holes in each of the corner portions of the bottom support. More particularly, the bypass holes are formed in the respective corners of the upstream flat side. The bypass holes have a size which is considerably larger than that of the through-holes. This location of the bypass holes is advantageous in the event that clogging of the filter should occur. In that case, the upwardly flowing flow, when it reaches the bottom support, is forced to be deflected out towards the corners of the bottom support for passage through the bypass holes and is then deflected again to be able to pass upwards through the through-openings in the bottom tie plate. By forcing the flow of coolant to change direction, the risk that foreign matter, which is possibly oriented such that it may pass through the bypass holes, should not be capable of being re-oriented such that it may also pass through the bottom tie plate, but adhere to the upstream side of the bottom tie plate, is reduced.

The advantage of the present invention is thus that an efficient filtering of the coolant may be achieved with an ensuing low pressure drop and that the risk of clogging is minimized.

BRIEF DESCRIPTION OF THE DRAWINGS

The invention will now be explained in greater detail with reference to the accompanying drawing figures.

DESCRIPTION OF THE PREFERRED EMBODIMENTS

Figure 1A:
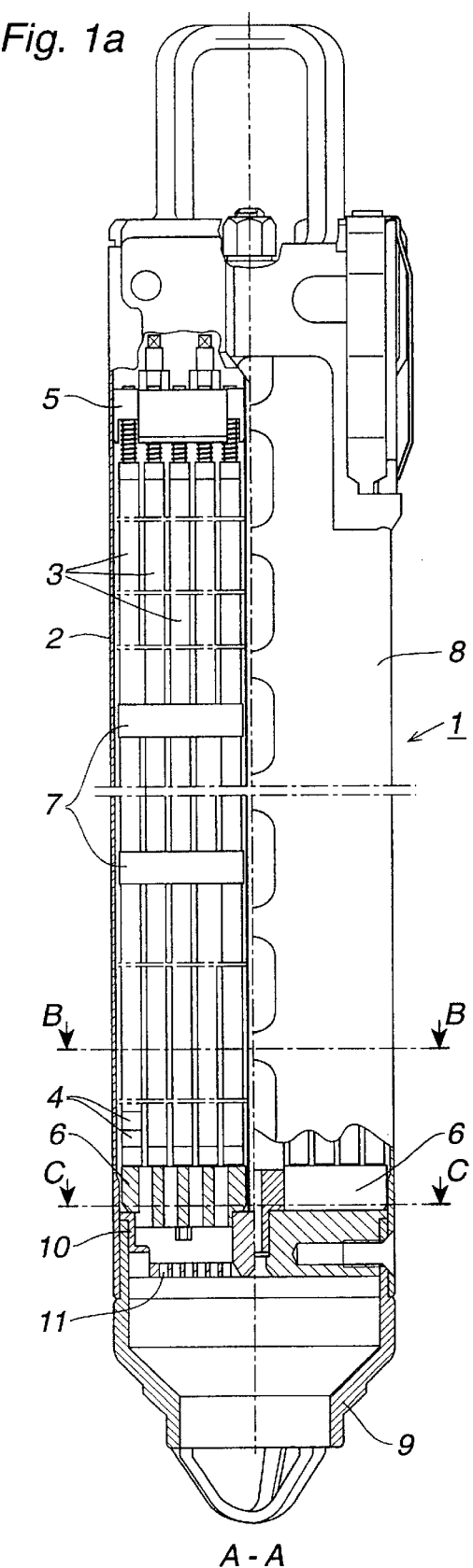
FIG. 1a shows in a section A—A in FIG. 1b a boiling water fuel assembly with spacers.
Figure 1B:
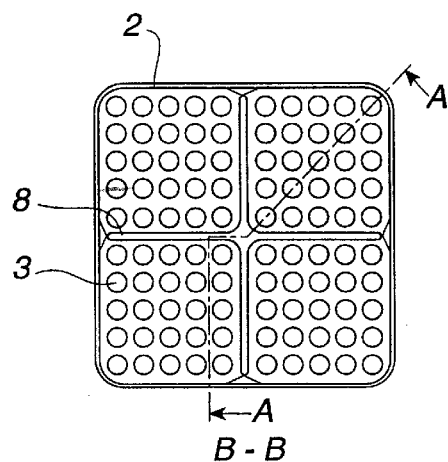
FIG. 1b shows in a section B—B in FIG. 1a the same fuel assembly.
Figure 1C:
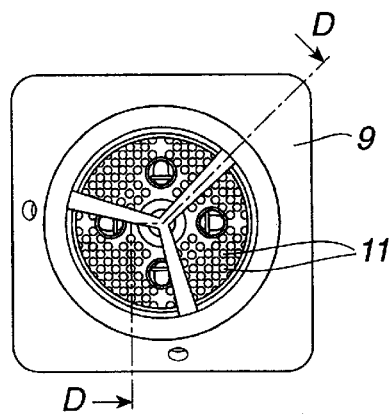
FIG. 1c shows the fuel assembly according to FIG. 1a in a view from below.

FIG. 1a shows a boiling water fuel assembly 1 which comprises a long tubular container, of rectangular cross section, referred to as fuel channel 2. The fuel channel 2 is open at both ends so as to form a continuous flow passage through which the coolant of the reactor flows. The fuel assembly 1 comprises a large number of equally long tubular fuel rods 3, arranged in parallel in a bundle, in which pellets 4 of a nuclear fuel are arranged. The fuel rods 3 are arranged spaced from each other in four orthogonal sub-bundles by means of a cruciform support means 8 (see also FIG. 1b). The respective sub-bundle of fuel rods 3 is retained at the top by a top tie plate 5 and at the bottom by a bottom tie plate 6. The fuel rods 3 in the respective sub-bundle are kept spaced apart from each other by means of spacers 7 and are prevented from bending or vibrating when the reactor is in operation. The spacer 7 according to the invention may, of course, also be used in a boiling water reactor which lacks the cruciform support means 8 and instead is provided with, for example, one or more water tubes.

At the lower part of the fuel assembly 1, a transition piece 9 is arranged. The task of the transition piece 9 is to guide coolant, flowing upwards through the core (not shown) of the nuclear reactor, to the fuel assembly 1 for cooling of the fuel rods 3 arranged therein. The transition piece 9 is arranged in the core in an opening in a so-called assembly supporting plate (not shown). Further, a bottom support 10 is arranged in the transition piece 9. The bottom tie plate 6 with the lower ends of the fuel rods 3 is arranged at least partly immersed into the bottom support 10. The bottom support 10 is provided with a plurality of through-holes 11 forming a filter.

Figure 2:
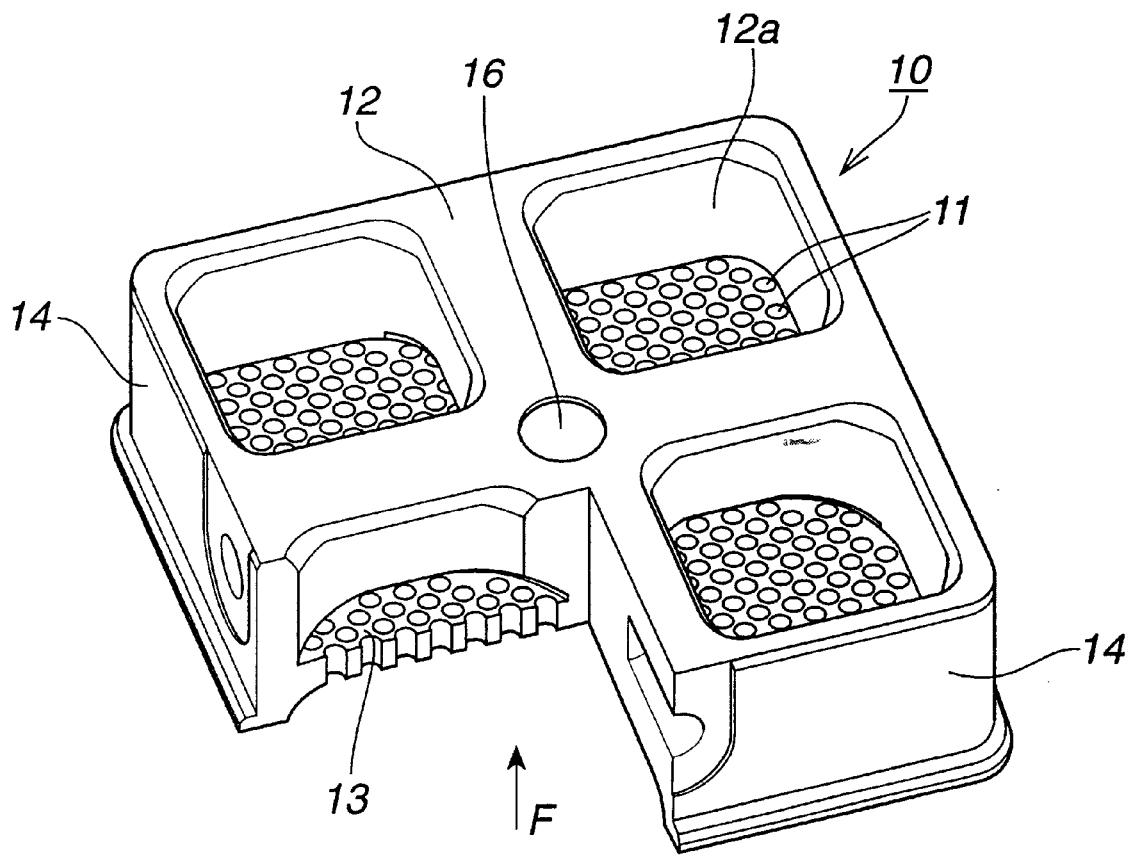
FIG. 2 shows, in perspective view, a section C—C in FIG. 1a of a bottom support with an integrated filter.

FIG. 2 shows the bottom support 10 in more detail. The bottom support 10 is substantially formed as a parallelepiped with a substantially square flat side. The direction of flow of the coolant is indicated by an arrow F. The parallelepiped is provided with a downstream and an upstream flat side 12, 13 and four narrow sides 14. The flat sides 12, 13 and the narrow sides 14 surround a cavity and form a parallelepiped. The downstream flat side 12 is formed with four openings 12a, where each opening 12a is adapted to receive the lower end of a sub-bundle. The holes are arranged in the upstream flat side 13 forming a filter through which the coolant F is forced to pass before it reaches the fuel rods arranged in the fuel bundle or in the fuel bundles. The holes 11 are substantially formed straight. Further, the bottom support 10 is provided with a passage opening 16 for passage of coolant to the cruciform support means 8. The cruciform support means 8 is formed as a channel for conducting non-boiling coolant up through the fuel assembly 1. Any foreign matter passing with the coolant through the fuel assembly does not run the risk of adhering to any unsuitable place therein.

Figure 3:
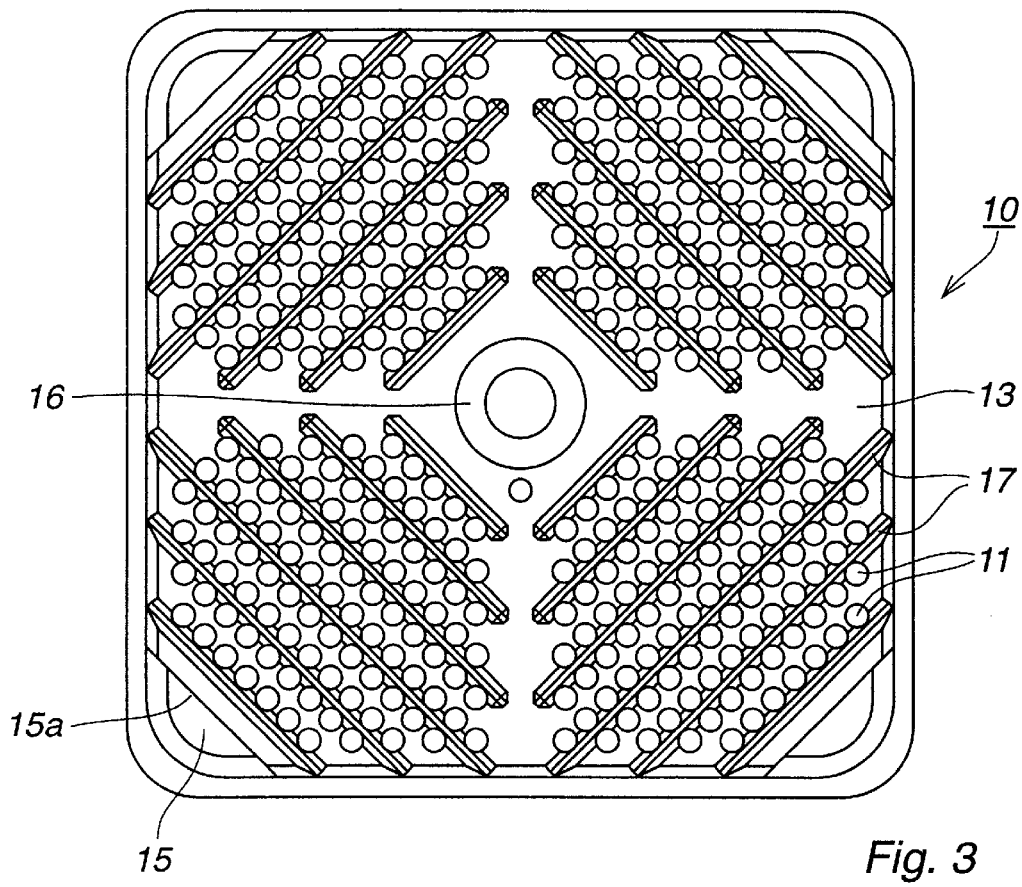
FIG. 3 shows an alternative embodiment of a bottom support with an integrated filter in a view from below.

The embodiment of the invention shown in FIG. 3 is provided with so-called bypass holes 15. The bypass holes 15 are arranged in the upstream flat side 13 and at the respective corners of the bottom support 10. The bypass holes 15 have a substantially triangular shape. By arranging bypass holes 15 in the corners of the bottom support 10, it is ensured that coolant may always pass through the bottom support 10. In the event that the filter should be clogged by foreign matter, coolant flow is thus allowed to pass through the bypass holes 15.

Figure 4:
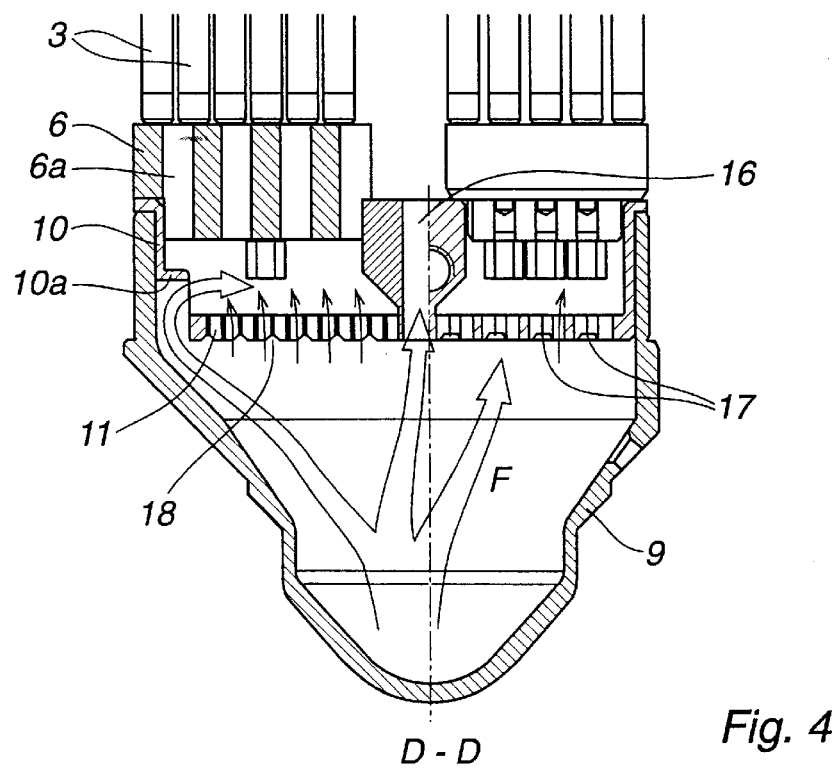
FIG. 4 shows, in a section D—D in FIG. 1c, a first embodiment of a lower part of a fuel assembly with a filter.

The bypass holes 15 are arranged such that the coolant flowing upwards through the fuel assembly 1 is forced to change its direction to be able to pass them (see the arrows F in FIG. 4). By this redirection of the coolant flow, any foreign matter is efficiently prevented from accompanying the coolant flow F up through the fuel assembly 1. The foreign matter which is possibly oriented such that it may pass with the coolant flow through the bypass holes 15 substantially maintains its orientation when the coolant flow F is forced to change its direction to be able to pass up through the bottom tie plate 6 to the fuel rods 3. Since the direction of the possible foreign matter is substantially maintained, the foreign matter will adhere to the bottom tie plate 6 and be prevented from passing up to the fuel bundle.

The upstream flat side 13 of the bottom support 10 is shown in more detail in FIG. 3. FIG. 3 shows the filtering part of the bottom support 10 in a view from below. The filtering part, like the fuel assembly in its entirety, is divided into four parts. In principle, a filtering part is arranged below the respective sub-bundle of fuel rods 3. In the example shown, the through-holes 11 are arranged in rows, which are substantially parallel with an opening edge at the respective bypass hole 15.

Figure 5:
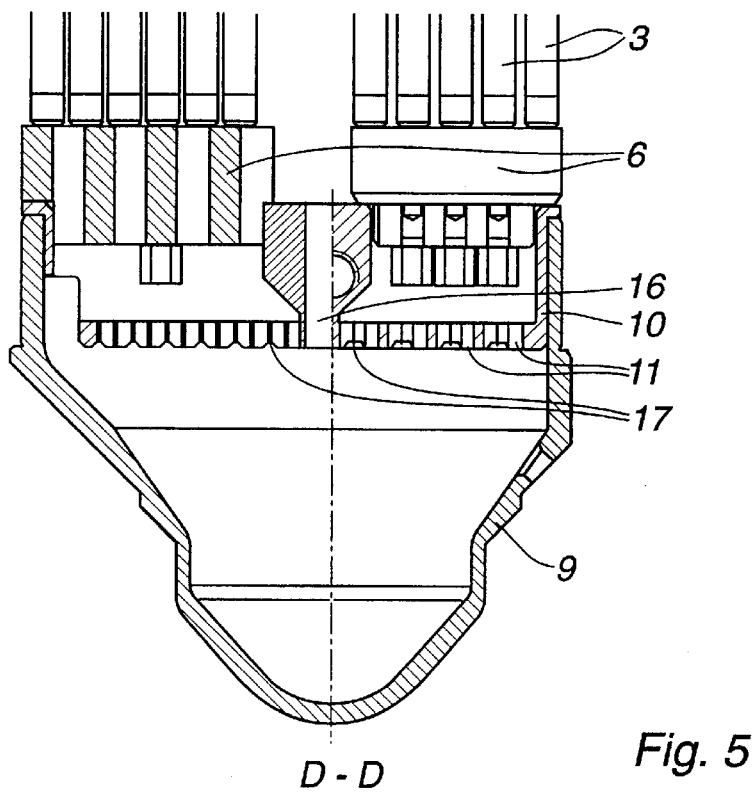
FIG. 5 shows, in a section D—D in FIG. 1c, a second embodiment of a lower part of a fuel assembly with a filter.
Figure 6:
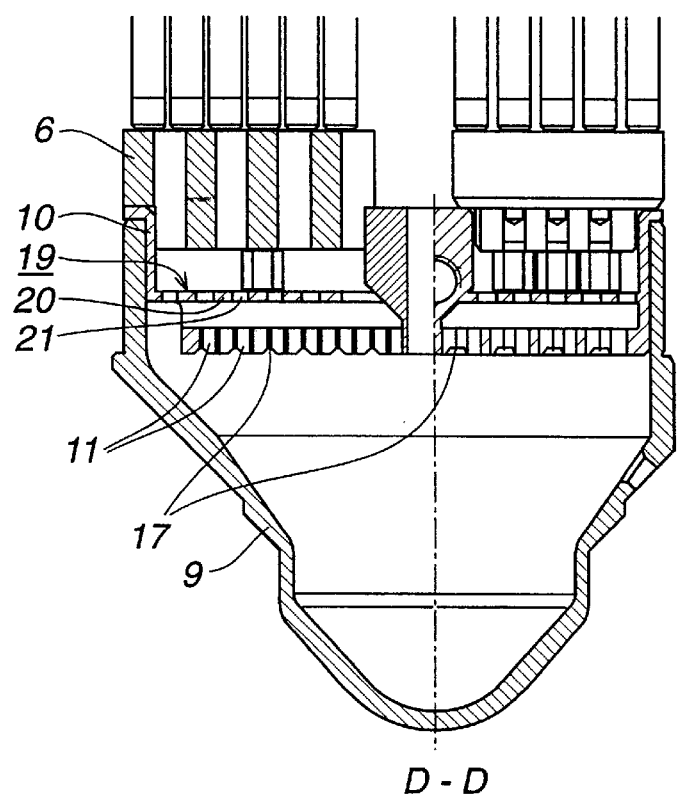
FIG. 6 shows, in a section D—D in FIG. 1c, a third embodiment of a lower part of a fuel assembly with a filter.

Further, the filter in the embodiment chosen in FIG. 3 is provided with a plurality of long and narrow grooves 17 (see also FIGS. 4–6). The grooves 17 are oriented so as to be arranged substantially parallel to an opening edge 15a of the respective bypass holes 15. By arranging grooves 17 in this way, an orientation of the possible foreign matter reaching the bottom support 10 is achieved, such that this foreign matter is prevented from being conducted out towards and through the bypass holes 15. The grooves 17 may, of course, also be oriented such that they are parallel to the respective narrow sides 14.

The embodiment with grooves 17 also prevents clogging of the filter in that any foreign matter, which is arranged towards the upstream edge of the filter, does not make tight contact but there is a certain distance between the respective foreign matter and the filter, whereby coolant, possibly with a certain reorientation, is allowed to pass by the captured foreign matter. In FIG. 4, this is illustrated by foreign matter, drawn into the figure and marked with reference numeral 18. A space is thus formed between the foreign matter 18 and the bottom of the groove 17.

The grooves 17 in the embodiments shown in FIGS. 3–6 have an additional function, namely, to form edges against which any foreign matter accompanying the coolant may be broken. The foreign matter which is broken when it reaches the surface provided with grooves 17 primarily consists of oxide flakes which have become detached from the fuel rods 3 and have accompanied the coolant. These oxide flakes do not give rise to any abrasion but may to some extent stop up and obstruct the flow passage if they have a size which is larger than the diameter of the holes 11 in the filter.

Further, FIG. 4 shows that that part of the bottom support 10, in which the trough-holes 11 are arranged, is relatively thick. This provides for a stable design of the filter and ensures that vibrations, caused by the flow of the coolant therethrough, are avoided. In the embodiment shown in FIG. 4, the bottom support 10 downstream of the filter is formed with a flange 10a. The flange 10a has a substantially triangular shape which corresponds to the shape of the respective bypass holes 15. The flange 10a is arranged at a level between the upstream and downstream flat sides 12, 13 and above the opening of the respective bypass hole 15. The task of the flange 10a is to guide the coolant flow F, which has passed through the bypass hole 15, into the central parts of the bottom support 10 and then allow the flow to pass upwards through the bottom tie plate 6. The embodiment chosen, shown in FIG. 4, also shows the open structure in the bottom tie plate 6. The through-holes 6a in the bottom tie plate 6 have a diameter which compensates for the increased pressure drop which is caused by the filter.

FIG. 5 shows an embodiment which corresponds to that shown in FIG. 4 apart from the fact that the bottom support is not provided with a flange 10a for guiding the coolant flow F.

FIG. 6 shows an alternative embodiment of the invention, in which an additional level with a second filtering member (see reference numeral 19) is arranged in the bottom support 10. This second filtering member is, in the example shown, formed as a plate 20 with through-holes 21. The through-holes 21 preferably have their centre axis somewhat displaced in relation to the centre axis of the through-holes 11 arranged in the upstream flat side 13. The plate 20 is preferably provided with a centrally arranged opening for passage of coolant to the passage opening 16.

Figure 7:
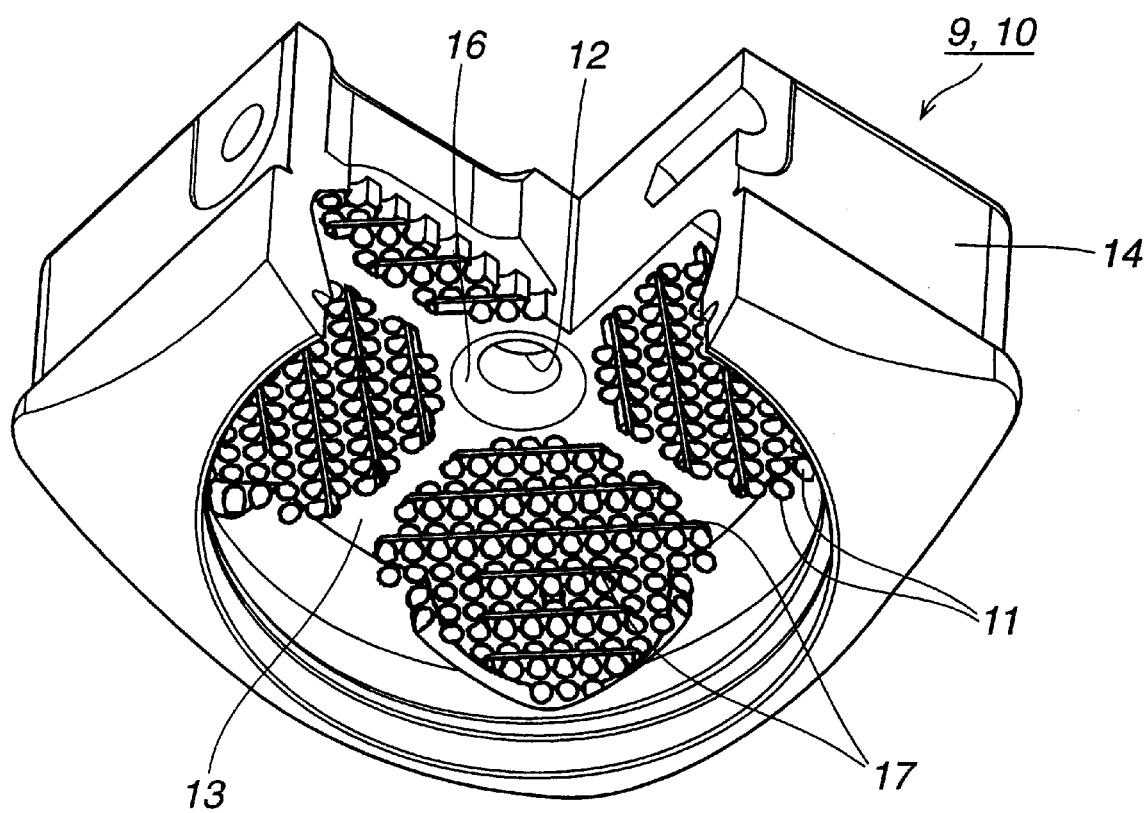
FIG. 7 shows, in perspective view from below, an alternative embodiment of a transition piece with a bottom support and filter integrated into the transition piece.

FIG. 7 shows an alternative embodiment of a transition piece 9. The bottom support 10 is arranged as an integral part of the transition piece 9. The filter in its turn is made as an integral part of the bottom support 10. In the embodiment shown, the filter is provided with through-holes 11 and grooves 17 in a manner corresponding to that shown in FIG. 3.

What is claimed is:

1. A fuel assembly for a boiling water nuclear reactor comprising a plurality of vertical fuel rods which are arranged, in spaced relationship, between a bottom tie plate and a top tie plate, wherein the bottom tie plate is provided with through-holes for passage of coolant (F), and a bottom support, wherein the bottom tie plate is arranged at least partly immersed into the bottom support, and wherein the bottom support is substantially formed by a downstream and an upstream flat surface and four side surfaces where the flat surfaces and the side surfaces form a parallelepiped which surrounds a cavity, wherein a filtering member is arranged as an integral part of the upstream flat surface and wherein the filtering member comprises a plurality of through-holes.

2. A fuel assembly according to claim 1, wherein the upstream flat surface comprises a plurality of substantially straight grooves.

3. A fuel assembly according to claim 1, wherein the through-holes are substantially straight.

4. A fuel assembly according to claim 1, wherein the upstream flat surface comprises bypass holes arranged at the respective corners.

5. A fuel assembly according to claim 4, wherein the bottom support in the cavity comprises a flange arranged above the respective bypass hole for the purpose of guiding the coolant which has passed through the bypass hole.

6. A fuel assembly (1) according to claim 4, characterized in that the bottom support (10) in the cavity comprises a second filtering member (19) comprising a plurality of continuous openings (21).

\* \* \* \* \*